United States Patent [19]

Bunge

[11] Patent Number: 4,954,554

[45] Date of Patent: Sep. 4, 1990

[54] SILICONE EMULSIONS

[75] Inventor: David J. Bunge, Midland, Mich.

[73] Assignee: Dow Corning Corporation, Midland, Mich.

[21] Appl. No.: 316,376

[22] Filed: Feb. 27, 1989

[51] Int. Cl.$^5$ .............................................. C08K 5/05
[52] U.S. Cl. .................................. 528/388; 524/386; 524/387; 525/100
[58] Field of Search ....................... 524/386, 387, 388; 525/100

[56] References Cited

PUBLICATIONS

Encyclopedia of Polymer Science and Technology; vol. 14, 1971, p. 157.

Primary Examiner—Melvyn I. Marquis
Attorney, Agent, or Firm—George A. Grindahl

[57] ABSTRACT

Aqueous emulsions of curable silicone compositions provide cured coatings having improved gloss and/or water-repellancy and/or adhesive release if formulated to contain polyvinylachohol having a degree of hydrolysis of 90 mol % or more. The extent of improvement is directly related to the degree of hydrolysis of the PVA. PVA having an average degree of hydrolysis of from 94 to 99 mol % is particularly effective for improving these properties of cured coatings. Conveniently, a mixture of two or more commercially available PVAs having different degrees of hydrolysis can be used to arrive at a PVA having a desired degree of hydrolysis.

18 Claims, No Drawings

SILICONE EMULSIONS

BACKGROUND OF THE INVENTION

The present invention relates to silicone emulsions. More particularly, the present invention relates to aqueous silicone emulsions that comprise a polyvinylalcohol component as an emulsifying agent.

Silicone emulsions comprising polyvinylalcohol, herein also referred to as PVA, of unspecified composition; or partially hydrolyzed polyvinylalcohol, herein also referred to as PHPVA, as an emulsifying agent have been known for a long time. For example, Dennett, U.S. Pat. No. 2,807,601, discloses a fabric treating composition comprising a hydroxy-endblocked polydimethylsiloxane fluid, a trimethyl-endblocked methylhydrogenpolysiloxane, PVA and sodium lauryl sulfate. As another example, Leavitt, U.S. Pat. No. 2,985,545, discloses a composition comprising a hydroxy-endblocked polydimethylsiloxane fluid, a methylhydrogenpolysiloxane, dibutyltin diacetate or dilaurate and a high viscosity PHPVA sold by E. I. duPont de Nemours Co. as Elvanol 50-42 and manufactured by partially (86-89%) hydrolyzing polyvinyl acetate. Leavitt also teaches that all nonionic emulsifiers, of which PVA is an example, are not satisfactory. Grenoble, U.S. Pat. No. 3,900,617, replaced the hydroxy-endblocked polydiorganosiloxane of Leavitt with a vinyl-endblocked polydiorganosiloxane and the tin salt with a platinum catalyst. Moeller, U.S. Pat. No. 4,008,346, prepared hydroxyl-endblocked polydiorganosiloxanes containing in-the-chain vinyl groups and vinyl-endblocked polydiorganosiloxanes by an emulsion polymerization process and used these emulsions, in conjunction with a platinum catalyst and an organohydrogenpolysiloxane, to prepare paper-coating emulsions. Moeller also added a dispersant to some of his coating emulsions, examples of which include a non-ionic, water-soluble hydroxyethyl cellulose and fully (98%) hydrolyzed polyvinylalcohol, herein also referred to as FHPVA. However, Moeller did not contemplate the use of 98% hydrolyzed polyvinylalcohol as an emulsifying agent for vinyl-containing polydiorganosiloxanes. Hockemeyer, U.K. Patent No. 1,541,801 claims a method for preparing an addition-curing coating emulsions which comprises mixing a curing catalyst with a vinyl polymer and thereafter emulsifying the mixture. Hockemeyer states that the emulsion can be formed with the aid of conventional dispersants, such as protective colloids, such as polyvinylalcohol having a degree of hydrolysis of 85 to 99 mol % and/or emulsifiers, such as polyglycol ethers of alcohols or alkylphenols. However, Hockemeyer apparently did not appreciate the benefit of using the more highly hydrolyzed polyvinylalcohol as an emulsifying agent for vinyl-containing polydiorganosiloxanes, since he disclosed no emulsions containing PVA. Traver et al., U.S. Pat. No. 4,190,688, prepared emulsions of hydroxyl-endblocked polydiorganosiloxanes containing in-the-chain vinyl groups and vinyl-endblocked polydiorganosiloxanes by the usual emulsifying methods, using PVA, and used these emulsions, in conjunction with a platinum catalyst or a tin catalyst and an organohydrogenpolysiloxane, to prepare paper-coating emulsions. As in Moeller, Traver et al, did not contemplate the use of FHPVA as an emulsifying agent for vinyl-containing polydiorganosiloxanes. Dallavia et al., U.S. Pat. Nos. 4,426,490 and 4,476,241, disclosed a catalyst emulsion comprising dioctyltin dineodeconate and PVA. Continuing the prevalent teachings of the past Dallavia et al. fail to specify the nature of the PVA and one can only conclude that patentees used the PHPVA that is occasionally specified in the art as a silicone emulsifying agent.

The silicone emulsion compositions of the art comprising PHPVA have been successful in the market place, principally because they do not contain significant amounts of solvents, the presence of which would require special handling to avoid toxic, safety and environmental problems, and because they do not require complex and/or expensive equipment for their preparation and use. However, PHPVA-based emulsions are not without drawbacks and improvements therein are being sought.

For example, PHPVA-based emulsions of curable silicone coating compositions typically lack the glossy appearance that characterizes their solventless and solvent-based analogs. Although the gloss of a silicone coating is regarded principally as an aesthetic quality it is, nevertheless, an important factor in the market place.

Additionally, PHPVA-based emulsions of adhesive-release coating compositions that are used to prepare peelable liners for pressure sensitive adhesives, herein also referred to as PSAs, sometimes display inadequate release of PSAs inasmuch as said release is too high. While the adhesive release force of a silicone coating can be increased by the addition of so-called high release additives, it is typically difficult to decrease its adhesive release force without compromising other properties of the coating, such as subsequent adhesion of the released adhesive, the curing profile of the coating or the film-integrity of the cured coating.

A coating having a glossy appearance and/or lower adhesive release can be obtained with an curable silicone emulsion composition, even though it has been prepared with only PHPVA, by decreasing the particle size of the emulsified curable silicone composition; however, this requires special handling and/or equipment, which adds to the cost of the composition.

Furthermore, the water resistance of a cured adhesive-release coating that results from a PHPVA-based silicone emulsion composition is, on occasion, insufficient to meet the processing requirements when an aqueous emulsion of a PSA is subsequently applied thereto.

BRIEF SUMMARY OF THE INVENTION

It is an object of the present invention to provide improved silicone emulsions for coating applications. It is another object of this invention to provide PVA-based silicone emulsions which provide a glossy cured coating and/or a cured coating having improved water-resistance and/or a coating having easier release of PSAs. It was an unexpected benefit of the present invention to be able to decrease the PSA release force of a cured silicone coating without changing the silicone components of the coating emulsion composition, or the particle size thereof.

These objects, and others which will become apparent to the practitioner of the silicone coatings art upon consideration of the following disclosure and appended claims, are obtained by emulsifying a curable silicone in water using, as the sole emulsifying agent, a PVA having an average degree of hydrolysis which is at least 90%.

Furthermore, within the scope of this invention, the physical properties, such as gloss, water-resistance and adhesive release, of a cured coating composition that is provided by the compositions of this invention can be varied by using a PVA having a degree of hydrolysis which ranges from 94 to 99%.

A desired degree of hydrolysis can be obtained by mixing two or more PVAs having differing degrees of hydrolysis, if desired; particularly when a desired PVA is not available.

The resulting emulsion compositions of this invention further comprise, or are mixed to comprise, an organohydrogenpolysiloxane crosslinking agent and/or a catalyst for accelerating the crosslinking reaction of the organohydrogenpolysiloxane with the curable organopolysiloxane.

The PVA that is used in the compositions of this invention is known as intermediately hydrolyzed (95.5–97.5%) PVA, herein also IHPVA, fully hydrolyzed (98.0–98.8%) PVA (FHPVA) and super hydrolyzed (99.3%+) PVA, herein also SHPVA; and is typically recommended by its producers for spun sizing for textiles, as a component for various adhesives and for surface sizing, pigment coating, casting papers, release papers and grease resistant papers. However, its use as an emulsifying agent for silicone coating emulsion compositions has apparently heretofore not been disclosed.

DETAILED DESCRIPTION OF THE INVENTION

The present invention relates, broadly, to an emulsion composition consisting essentially of: (A) a curable composition comprising an organopolysiloxane bearing silicon-bonded curing radicals selected from the group consisting of the hydroxyl radical and olefinic radicals; (B) a polyvinylalcohol emulsifying agent having an average degree of hydrolysis of at least 90 mol %; and (C) water.

Component (A) of the compositions of this invention can be any curable silicone composition which comprises at least one curable organopolysiloxane which bears at least two silicon-bonded curing radicals selected from the hydroxyl radical, i.e. the silanol radical, and olefinic radicals.

The curable organopolysiloxane of Component (A) has the formula $R_aR'_b SiO_{(4-a-b)/2}$ wherein R denotes a monovalent hydrocarbon radical having from 1 to 20 carbon atoms and being free of aliphatic unsaturation, R' denotes said curing radical, a and b denote numbers whose sum has a value of from about 0.9 to 2.7, preferably 0.9 to 2.2, and b has a value sufficient to provide the desired number of curing radicals per molecule.

Examples of R radicals include, but are not limited to, alkyl radicals, such as methyl, ethyl, propyl, isopropyl, butyl, hexyl, octyl, decyl and octadecyl; aryl radicals, such as phenyl, tolyl and xenyl; and aralkyl, such as benzyl and beta-phenylethyl. For coating compositions of this invention at least 50, preferably at least 90, mol % of the R radicals of the organopolysiloxane are methyl radicals.

R' radicals are selected from hydroxyl radicals and A radicals where A denotes an olefinic radical having from 2 to 20 carbon atoms; such as alkenyl, such as vinyl, allyl, butenyl, pentenyl, hexenyl and decenyl; and cycloalkenyl, such as beta-cyclohexenylethyl. From a cost perspective A is preferably a vinyl radical; however, from a reactivity perspective A is preferably higher alkenyl, such as 5-hexenyl. Of course, the R' radicals can be the same or different, as desired.

The organopolysiloxane can be a single organopolysiloxane or a mixture of two or more organopolysiloxanes and each organopolysiloxane can have any arrangement of siloxane units, such as linear, cyclic, branched or combinations thereof; and any viscosity, such as that of a freely flowing liquid, a slowly flowing liquid or a substantially non-flowing solid, provided that it is soluble in one or more solvents, such as benzene, toluene, heptane, methylene chloride or cyclohexane, which are typically used to dissolve organopolysiloxane. For example, Component (A) can comprise a mixture of one or more polydiorganosiloxane fluids and, optionally, one or more solid, benzene-soluble organopolysiloxane resins to provide the well-known benefits, such as film toughness and increased adhesive release, that are typically obtained from the use of silicone resins.

Specific types of curable organopolysiloxanes which are suitable for use in Component (A) of the compositions of this invention include, but are not limited to, polydiorganosiloxanes having the average unit formula $R_aR'_bSiO_{(4-a-b)/2}$ wherein R and R' are as denoted above and a and b denote numbers whose sum has a value of from about 2.0 to 2.2 and b has a value sufficient to provide the desired number of curing radicals per molecule, such as hydroxyl-endblocked polydiorganosiloxanes; such as $HOR_2SiO(R_2SiO)_x(RASiO)_ySiR_2OH$ and $HORASiO(R_2SiO)_x(RASiO)_ySiRAOH$, and hydrocarbyl-endblocked polydiorganosiloxanes; such as $AR_2SiO(R_2SiO)_x(RASiO)_ySiR_2A$ and $R_3SiO(R_2SiO)_x(RASiO)_ySiR_3$, wherein x and y have values of zero or more, with the proviso that there be at least two curing radicals per molecule of polydiorganosiloxane, R is as noted above and A denotes an olefinic radical; silanol-containing resins having the formulae $(R_3SiO_{\frac{1}{2}})_i(R_2SiO_{2/2})_j(SiO_{4/2})_k$, $(R_3SiO_{\frac{1}{2}})_i(SiO_{4/2})_k$; and $(R_2SiO_{2/2})_j(SiO_{4/2})_k$; and silanol-free or silanol-containing resins having the formulae $(R_2ASiO_{\frac{1}{2}})_i(R_2SiO_{2/2})_j(SiO_{4/2})_k$, $(R_2ASiO_{\frac{1}{2}})_i(SiO_{4/2})_k$, $(R_3SiO_{\frac{1}{2}})_i(RASiO_{2/2})_j(SiO_{4/2})_k$, $(RASiO_{2/2})_j(SiO_{4/2})_k$ and $(R_2ASiO_{\frac{1}{2}})_i(RASiO_{2/2})_j(SiO_{4/2})_k$, wherein i, j and k have values greater than zero and R and A are as noted above.

Specific examples of curable organopolysiloxanes include linear polydiorganosiloxanes having the formulae $HOMe_2SiO(Me_2SiO)_xSiMe_2OH$, $Me_3SiO(Me_2SiO)_x(MeViSiO)_ySiMe_3$, $ViMe_2SiO(Me_2SiO)_xSiMe_2Vi$, $ViMe_2SiO(Me_2SiO)_x(MeViSiO)_ySiMe_2Vi$, $Me_3SiO(Me_2SiO)_x(MeHeSiO)_ySiMe_3$, $HeMe_2SiO(Me_2SiO)_xSiMe_2He$, $HeMe_2SiO(Me_2SiO)_x(MeHeSiO)_ySiMe_2He$ and $HOMe_2SiO(Me_2SiO)_x(MeViSiO)_ySiMe_2OH$, where x has a value of from 10 to 1000 and y has a value of from 2 to 10 when the endgroups contain only methyl radicals and a value of from 1 to 10 when the endgroups contain alkenyl radicals; and resinous organopolysiloxanes having the formulae $(Me_3SiO_{\frac{1}{2}})_{0.9}(ViMe_2SiO_{\frac{1}{2}})_{0.09}(SiO_{4/2})$, $(Me_3SiO_{\frac{1}{2}})_{0.9}(HeMe_2SiO_{\frac{1}{2}})_{0.09}(SiO_{4/2})$ and $(Me_3SiO_{\frac{1}{2}})_{0.9}(SiO_{4/2})$. Herein Me, Vi and He denote the methyl, vinyl and 5-hexenyl radical, respectively.

A highly preferred curable organopolysiloxane is a polydiorganosiloxane having the formula $AMe_2SiO(Me_2SiO)_x(MeASiO)_ySiMe_2A$, optionally mixed with an organopolysiloxane resin having the formula $(Me_3SiO_{\frac{1}{2}})_i(AMe_2SiO_{\frac{1}{2}})_j(SiO_{4/2})_k$, wherein A denotes an alkenyl radical, Me denotes the methyl radical, x has an average values of 10 or more and y has a value of from 0 to 0.1x, (i+j)/k has a value of from 0.6/1.0 to 1.2/1.0 and j/i has a value of 0.02/1.0 to 0.5/1.0.

The curable organopolysiloxanes of Component (A) are well known in the silicone art and needs no detailed delineation herein. Suitable hydroxyl- and hydrocarbyl-endblocked polydiorganosiloxane are disclosed, for example, in U.S. Pat. Nos. 2,807,601; 2,985,545; 3,900,617; 4,190,688; 4,293,671; 4,476,241; 4,559,396; 4,562,096; 4,587,136 and 4,609,574 which are included herein by reference to further delineate polydiorganosiloxanes and how to make them. Suitable hydroxyl- and olefinic-containing organopolysiloxane resins are disclosed, for example, in U.S. Pat. Nos. 2,676,182; 3,284,406; 3,527,659; 4,123,604 and 4,611,042 which are included herein by reference to further delineate organopolysiloxane resins and how to make them.

The curable organopolysiloxane of Component (A) must be curable to the insoluble state; preferably to the insoluble elastomeric state. By insoluble it is meant that the cured organopolysiloxane cannot be completely dissolved in the common solvents that are used to dissolve the uncured organopolysiloxane, delineated above, at room temperature.

Curing of the organopolysiloxane is preferably accomplished by reacting the organopolysiloxane with at least one crosslinking agent, such as an organoperoxide, an organohydrogenpolysiloxane, or a mercaptoalkyl-substituted siloxane, typically at elevated temperature and/or in the presence of a catalyst or photosensitizer. The crosslinking agent can be included in Component (A) with the organopolysiloxane at the time the emulsion composition is prepared and/or it can be mixed therewith at a later time. However, the crosslinking agent and curable organopolysiloxane should not be present together in the emulsion, in the presence of said catalyst, delineated below, until shortly before, e.g. less than about 48 hours before, the organopolysiloxane is to be cured.

Organohydrogenpolysiloxane crosslinking agents which are suitable for use in the compositions of this invention have the average unit formula $R_cH_dSiO_{(4-c-d)/2}$ wherein R denotes a monovalent hydrocarbon radical free of aliphatic unsaturation, c and d denote numbers whose sum has a value of from about 0.9 to 3.0 and d has a value sufficient to provide the desired number of hydrogen atoms, at least two, per molecule. The hydrogen atoms can be located anywhere in the organohydrogenpolysiloxane molecule.

Examples of R radicals in the organohydrogenpolysiloxane include, but are not limited to, those illustrated for the R radicals of the organopolysiloxane, above. For coating compositions of this invention at least 50, preferably at least 90, mol percent of the R radicals of the organohydrogenpolysiloxane are methyl radicals.

The organohydrogenpolysiloxane can be a single organohydrogenpolysiloxane or a mixture of two or more organohydrogenpolysiloxanes, each of which can have any arrangement of siloxane units, such as linear, cyclic, branched or combinations thereof; and can have any viscosity, such as that of a freely flowing liquid, a slowly flowing liquid or a substantially non-flowing solid, provided that it is soluble in one or more solvents, such as benzene, toluene, heptane, methylene chloride or cyclohexane, which are typically used to dissolve silicones.

Specific types of organohydrogenpolysiloxane which are suitable for use in the compositions of this invention include, but are not limited to, hydrogen-endblocked siloxanes, such as $HR_2SiO(R_2SiO)_m(RHSiO)_nSiR_2H$; wherein m and n have values of zero or more and hydrocarbyl-endblocked siloxane, such as $R_3SiO(R_2SiO)_m(RHSiO)_nSiR_3$, wherein m has a value of zero or more, and n has a value of two or more, and R is as noted above; and silanol-free or silanol-containing siloxane resins having the formulae $(R_2HSiO_{1/2})_i(R_2SiO_{2/2})_j(SiO_{4/2})_k$; $(R_2HSiO_{1/2})_i(SiO_{4/2})_k$; $(R_3SiO_{1/2})_i(RHSiO_{2/2})_j(SiO_{4/2})_k$; $(RHSiO_{2/2})_j(SiO_{4/2})_k$ and $(R_2HSiO_{1/2})_i(RHSiO_{2/2})_j(SiO_{4/2})_k$, wherein i, j and k have values greater than zero and R is as noted above.

Specific examples of organohydrogenpolysiloxane crosslinking agents include cyclic siloxanes, such as methylhydrogencyclopolysiloxanes having the unit formula $(MeHSiO_{2/2})_e$ where e has an average value of from 3 to 10; linear methylhydrogenpolysiloxanes having the formulae $HMe_2SiO(MeHSiO)_e(Me_2SiO)_f SiMe_2H$, $HMe_2SiO(Me_2SiO)_fSiMe_2H$ and $Me_3SiO(MeHSiO)_eMe_2SiO)_fSiMe_3$ where e and f are 3 to 30 and $Me_3SiO(MeHSiO)_gSiMe_3$ wherein g has a value of from 30 to 70; branched siloxanes such as $(HMe_2SiO)_4Si$ and $MeSi(OSiMe_2H)_3$; and the resinous organohydrogenpolysiloxane crosslinkers disclosed by Blizzard et al. in U.S. Pat. No. 4,310,678, and by Brady in U.S. Pat. No. 3,627,851.

A preferred organohydrogenpolysiloxane has the formula $Me_3SiO(Me_2SiO)_m(MeHSiO)_nSiMe_3$, wherein m has a value of zero or more, n has a value of two or more, and Me denotes the methyl radical. As with any organohydrogenpolysiloxane crosslinking agent, this preferred organohydrogenpolysiloxane can be a single type of organohydrogenpolysiloxane or a mixture of two or more types of organohydrogenpolysiloxanes.

Organohydrogenpolysiloxanes are well known in the silicone art and needs no detailed delineation herein. Suitable organohydrogenpolysiloxanes are disclosed, for example, in U.S. Pat. Nos. 2,807,601; 2,985,545; 3,627,851; 3,900,617; 4,154,714; 4,190,688; 4,293,671; 4,310,678; 4,476,241; 4,559,396; 4,562,096 and 4,609,574; which are included herein by reference to further delineate organohydrogenpolysiloxanes and how to make them.

Typically the emulsion compositions of this invention comprise, or are mixed to comprise, an effective amount of a catalyst to accelerate the curing reaction of the crosslinking agent with the organopolysiloxane bearing curing radicals. The catalyst can be included in Component (A) with the curable organopolysiloxane at the time the emulsion composition is prepared and/or mixed therewith at a later time. However, the catalyst and curable organopolysiloxane should not be present together in the emulsion, in the presence of a crosslinking agent, delineated above, until shortly before, e.g. less than about 48 hours before, the organopolysiloxane is to be cured.

Examples of suitable, well-known curing catalysts include, but are not limited to, organoperoxides, such as benzoyl peroxide; platinum-group metals and their compounds, such as chloroplatinic acid and it complexes, rhodium compounds, supported platinum and complexes of platinum; tin and lead salts of carboxylic acids, such as stannous octoate, dibutyltin diacetate and dibutyltin dilaurate; and photosensitizers, such as benzophenone.

The curable compositions of this invention preferably comprise a platinum-containing hydrosilylation catalyst. A particularly useful platinum-containing catalyst for the curable compositions of this invention is the chloroplatinic acid-vinylsiloxane complex disclosed by Willing in U.S. Pat. No. 3,419,593, hereby incorporated by reference. However, the platinum-containing catalyst can be any of the well-known materials that are effective for catalyzing the hydrosilylation reaction of silicon-bonded hydrogen atoms with silicon-bonded olefinic radicals.

The amount of crosslinking agent to be used in the compositions of this invention is not normally critical, it only being necessary to have an effective amount thereof to fully cure the organopolysiloxane, as measured by the tests delineated below. For example, an organohydrogenpolysiloxane crosslinking is used in an amount sufficient to provide from about 0.5 to 10, preferably about 0.9 to 3, silicon-bonded hydrogen atoms for every curing radical in the composition.

When used in the compositions of this invention a curing catalyst is usually used in a sufficient amount to provide a rapid cure rate for the composition. The exact amount of said catalyst will depend on the particular catalyst that is used and is not easily predicted. However, for chloroplatinic acid and its complexes, an amount sufficient to provide from 10 to 1000, typically 50 to 100, parts by weight of platinum for every one million parts by weight of the Component (A) is usually sufficient. Within this range routine experimentation can be used to determine the optimum amount of catalyst needed for any particular cure time.

The emulsion compositions of this invention can comprise any amount of Component (A) that is typically used in silicone emulsion, such as from 1 to 75, preferably 1 to 50, and most preferably 10 to 40 parts by weight for every 50 parts by weight of water.

Component (B) of the emulsion compositions of this invention is a polyvinylalcohol having a degree of hydrolysis of at least 90 mol %, preferably from 90 to 99 mol %, and most preferably from 94 to 99 mol %.

PVA is made by hydrolyzing polyvinyl acetate to various degrees. The degree of hydrolysis of a PVA is a number which represents the percentage of pendant acetate groups, originally present in the polyvinyl acetate, that have been converted to pendant hydroxyl groups. The PVA that is used in the compositions of this invention is known as intermediately hydrolyzed (95.5–97.5%) PVA, herein also IHPVA; fully hydrolyzed (98.0–98.8%) PVA (FHPVA); and super hydrolyzed (99.3%+) PVA, herein also SHPVA.

It has been discovered that a composition of this invention comprising a vinyl-substituted polydiorganosiloxane, an organohydrogenpolysiloxane and a platinum-containing hydrosilylation catalyst provides a cured coating having an adhesive release force which is related to the degree of hydrolysis of the PVA that is used in the emulsion. Thus, as the degree of hydrolysis of the PVA is increased from 88 to 90 and beyond, the adhesive release force of the resulting cured composition decreases. Furthermore, the decrease in release force with PVA hydrolysis is substantially linear from 88 to 92, after which a less-than-extrapolated release value, i.e. easier-than-extrapolated release, is obtained. It was also surprising to note that the gloss of the cured adhesive-releasing coating increased in like manner from no gloss to high gloss, with a greater amount of gloss-improvement occurring when the degree of hydrolysis was at least 94 mol %.

Thus, this invention further relates to an emulsion composition consisting essentially of: (A) a curable composition comprising an organopolysiloxane bearing silicon-bonded curing radicals selected from the group consisting of the hydroxyl radical and olefinic radicals; (B) a polyvinylalcohol emulsifying agent having an average degree of hydrolysis of from 94 to 99 mol %; and (C) water.

Component (A) of this aspect of the invention is the same as delineated above, including preferred embodiments thereof.

Component (B) can be a single type of PVA, such as IHPVA or FHPVA; or a mixture of two or more types of PVA, such as a mixture of PHPVA and IHPVA; a mixture of PHPVA and FHPVA; a mixture of IHPVA and FHPVA; a mixture of PHPVA and SHPVA or a mixture of PHPVA, IHPVA and FHPVA. It is only necessary to be certain, when using PHPVA in the compositions of this invention, to use a sufficient amount of PVA of a higher degree of hydrolysis so that the average degree of hydrolysis of the mixture of PVAs is at least 90 mol %.

Thus, this invention also relates to an emulsion composition consisting essentially of: (A) a curable composition comprising an organopolysiloxane bearing silicon-bonded curing radicals selected from the group consisting of the hydroxyl radical and olefinic radicals; (B) a polyvinylalcohol emulsifying agent having an average degree of hydrolysis of at least 90 mol % and consisting of a mixture of two or more polyvinylalcohols which differ in degrees of hydrolysis; and (C) water.

As with the embodiments mentioned above Component (A) of this aspect of the invention is the same as delineated above, including preferred embodiments thereof.

PVA is commercially available in various molecular weights, normally expressed in terms of the viscosity of a 4% aqueous solution of the PVA. PVA is available as low (3 to 15 centipoise) viscosity, medium (16 to 30 centipoise) viscosity and high (greater than 40 centipoise) viscosity.

The molecular weight of the PVA that is used to prepare the compositions of this invention does not appear to be critical inasmuch as the desired gloss and adhesive release force control can be obtained merely by assuring that the degree of hydrolysis of the PVA is, on average, at least 90 mol %.

The amount of PVA that is used in the compositions of this invention is not substantially different from the amount of PVA having a lower degree of hydrolysis that is taught in the art. Typically, from about 1 to 5 percent by weight, based on the weight of Component (A) in the emulsion, of PVA is used.

The third essential component of the compositions of this invention is water, preferably clear water, and most preferably distilled and/or deionized water.

The emulsion compositions of this invention can contain non-essential components which are typically used in silicone compositions. Examples of said non-essential components include viscosity-increasing additives, such as carboxymethyl cellulose, hydroxyethyl cellulose and sodium alginates; cure-control additives, such as the well-known platinum catalyst inhibitors; organic solvents for the silicone portion of the emulsion; and antibiotic agents to retard or prevent the microbial contamination of the emulsion.

The emulsion compositions of this invention can be prepared by any of the well-known methods for preparing silicone emulsions which comprise polyvinylalcohol. The reader is referred to the patents disclosed herein above for methods for preparing silicone emulsions. These patents, which have been incorporated herein by reference to teach how to prepare organohydrogenpolysiloxanes and organopolysiloxanes, are incorporated also to teach how to make the emulsion compositions of this invention using PVA having a degree of hydrolysis of at least 90 mol %.

The compositions of this invention find utility as coating compositions for various substrates; such as paper, cardboard, polymeric films, metal foils and textiles, to provide for various benefits, such as for the protection and/or appearance of the substrate or for the release of sticky materials, such as pressure sensitive adhesives, petroleum solids and various foods from the substrate.

The curable emulsion compositions of this invention are cured by incorporating therein a crosslinking amount of a crosslinking agent, delineated above, and a catalytic amount of a catalyst, delineated above, for accelerating the reaction of the crosslinking agent with the organopolysiloxane bearing at least two curing radicals. The crosslinking agent and/or catalyst can added to the emulsion as an emulsion, such as an emulsion comprising a PVA having the typical degree of hydrolysis of less than 90 mol % or a degree of hydrolysis of 90 mol % or more, as delineated above.

In a preferred embodiment of this invention a non-curing emulsion of this invention comprising the organopolysiloxane and the organohydrogenpolysiloxane is provided as one package and a non-curing emulsion of this invention comprising the organopolysiloxane and the catalyst is provided as another package. When the composition is to be used the two packages are mixed in sufficient amounts to provide a composition which will cure when exposed to the proper conditions.

The following examples are disclosed to further teach how to make and use, but not to limit, the present invention which is properly delineated by the appended claims. All parts and percentages are by weight unless stated otherwise.

Stability of an emulsion was determined by a centrifuge test which consisted of placing 50 mL of sample, containing a few drops of alcohol-free, aqueous red dye, in a graduated conical centrifuge tube and centrifuging for 30 minutes at 3000 rpm. The centrifuge was an International Model HN-S available from Sargent Welch Scientific Co., Skokie, ILL., as Cat. No. S-16310. The centrifuged sample was examined visually for non-emulsified oil at the surface, creaming of emulsified oil at the top, settling of the continuous phase at the bottom and sludge at the bottom. A suitable emulsion must have no more than a trace of surface oil and sludge and less than 2% by volume creaming and settling.

The average particle size of an emulsion was determined by laser light scattering using a Model 3600 E Type particle size analyzer from Malvern Instruments of Malvern, England.

Cure time for a coating composition was determined by coating the curable coating composition onto supercalendered kraft paper from a 10% silicone emulsion, using a #5 Mayer Rod, and heating at 220°, 250° or 300° F. in 5 second increments in a forced air oven until the coating was cured. The state of cure of a coating was determined by the rub-off, migration and smear tests.

Smear was measured by lightly rubbing the coating with a finger and observing the coating for a hazy appearance. The amount of haze was estimated and rated as none, very slight, slight, moderate or gross. A fully cured coating displays no haze and therefore has no smear.

Rub-off was measured by vigorously rubbing the coating with the index finger tip, trying to remove the coating from the paper. The amount of rub-off was estimated and rated as none, very slight, slight, moderate or gross. A fully cured coating displays no rub-off.

Migration was measured by placing a strip of transparent adhesive tape on the coating and rubbing the strip 5 to 10 times with a finger to adhere the strip to the coating. The strip was then removed and its adhesive-bearing surface doubled back on itself and slowly separated. The difference in force, relative to the force needed to separate a fresh strip, was then estimated and rated as none, very slight, slight, moderate or gross. A fully cured coating displays no difference and thus has no migration.

For release and subsequent adhesion testing a coating was coated onto supercalendered kraft paper using a #5 Mayer Rod (0.6 pounds per 3000 square feet) and the coating was heated at 220°, 250° or 300° F. until the coating was fully cured. After 1 hour the cured coating was transfer laminated to adhesive, 1 mil thick, and the laminates were aged at room temperature for 16 hours before initial release values were measured.

The laminates were evaluated for release by cutting the laminates into 1×6 inch strips and the laminate was pulled apart at a rate of 400 inches/minute using a Scott Tester. The values recorded are the average of 5 readings taken during the course of one pull per sample.

Subsequent Adhesion of an adhesive was measured by applying the adhesive that had been pulled from the cured coating to a clean stainless steel panel, using two passes of a 4.5 pound roller, and measuring the force required to remove the tape therefrom at an angle of 180°, using the Keil Tester at 12 inches per minute.

Water-resistance was measured by applying an aqueous solution of Shirlstain A (Shirley Development Products; Manchester, England) to the cured coating on paper for 15 seconds. The dye stains silicone yellow, paper red and PVA red. Good water-resistance of a coating is indicated by no, or only trace, red staining; fair water-resistance by minor red staining; poor water-resistance by major red staining; and no water-resistance by complete red staining.

The materials that are referenced in these examples have the following identity.

PVA 1 - An aqueous solution of Vinol(R) 523 - a partially hydrolyzed PVA having a degree of hydrolysis of 88% and a 4% aqueous solution viscosity of 24 centipoise (cP) at 25° C. Available from Air Products.

PVA 2 - An aqueous solution of Vinol 425 - an intermediately hydrolyzed PVA having a degree of hydrolysis of 96% and a 4% aqueous solution viscosity of 28 cP at 25° C.

PVA 3 - An aqueous solution of Vinol WS-42 - an intermediately hydrolyzed PVA having a degree of hydrolysis of 97% and a 4% aqueous solution viscosity of 14 cP at 25° C.

PVA 4 - An aqueous solution of Vinol 325 - a fully hydrolyzed FVA having a degree of hydrolysis of 98.5% and a 4% aqueous solution viscosity of 28 cP at 25° C.

The PVA solutions were prepared by dispersing 144 parts of the PVA in 1356 parts of distilled, room-temperature water and heating slowly to 93° C. Maintain at 93° C. for 30 minutes and then cool to room temperature.

Organopolysiloxane 1 - A polydiorganosiloxane having the formula ViMe$_2$SiO(Me$_2$SiO)$_{196}$(MeViSiO)$_2$-SiMe$_2$Vi.

Organopolysiloxane 2 - A polydiorganosiloxane having the formula HeMe$_2$SiO(Me$_2$SiO)$_{150}$ (MeHeSiO)$_3$-SiMe$_2$He.

Organopolysiloxane 3 - A polydiorganosiloxane having the formula ViMe$_2$SiO(Me$_2$SiO)$_{25}$SiMe$_2$Vi.

Organopolysiloxane 4 - A benzene-soluble siloxane resin containing (ViMe$_2$SiO$_{\frac{1}{2}}$), (Me$_3$SiO$_{\frac{1}{2}}$), and (SiO$_{4/2}$) siloxane units in sufficient amounts to provide a vinyl analysis of 1.8 by weight and 0.7 hydrocarbyl-containing siloxane units for every SiO$_{4/2}$ unit.

Organopolysiloxane 5 - An equal weight mixture of Organopolysiloxanes 3 and 4.

Organohydrogenpolysiloxane 1 - Me$_3$SiO(Me$_2$SiO)$_3$-(MeHSiO)$_5$SiMe$_3$.

Organohydrogenpolysiloxane 2 - Me$_3$SiO(Me$_2$SiO)$_{12}$(MeHSiO)$_{28}$-SiMe$_3$.

Organohydrogenpolysiloxane 3 - Me$_3$SiO(Me$_2$SiO)$_5$-(MeHSiO)$_4$SiMe$_3$.

Organohydrogenpolysiloxane 4 - Me$_3$SiO(MeHSiO)$_{35}$SiMe$_3$.

SBR - Solvent-based adhesive 36-6045 from National Starch; New York, NY.

GMS - Solvent-based acrylic adhesive GMS-263 from Monsanto; St. Louis, MO.

EXAMPLES 1 AND 2

Emulsion compositions of this invention were prepared by mixing 2703 parts of Organopolysiloxane 1, 528 parts of Organohydrogenpolysiloxane 1 and 912 parts of Organohydrogenpolysiloxane 3 and slowly dispersing 160 parts of the resulting curable mixture into 77.4 parts of rapidly stirred PVA 2 (Example 1) or PVA 4 (Example 2). The resulting thick phases were then separately milled on a laboratory colloid mill at 12 mils, diluted with 162 parts of distilled water containing a small amount of a biocide and moderately mixed for about an hour. The emulsions were found to have particle sizes of 2.5 and 3.6 micrometers, respectively.

COMPARISON COMPOSITION 1

A comparison emulsion composition was prepared by following the method of Example 1, but using PVA 1 instead of PVA 2 and a larger scale colloid mill. The emulsion was found to have a particle size of 3.2 micrometers.

EXAMPLES 3 AND 4

Emulsion compositions of this invention were prepared by mixing 4017 parts of Organopolysiloxane 1, 64 parts of a mixture of polymethylvinylcyclosiloxanes and 64 parts of a platinum-containing catalyst, and slowly dispersing 160 parts of the resulting curable mixture into 77.4 parts of rapidly stirred PVA 2 (Example 3) or PVA 4 (Example 4). The resulting thick phases were then milled on a laboratory colloid mill at 12 mils, diluted with 162 parts of distilled water containing a small amount of a biocide and moderately mixed for about an hour. The emulsions were found to have particle sizes of 3.0 and 3.5 micrometers, respectively.

COMPARISON COMPOSITION 2

A comparison emulsion composition was prepared by following the method of Example 3, but using PVA 1 instead of PVA 2 and a larger scale colloid mill. The emulsion was found to have a particle size of 3.2 micrometers.

CURED COMPOSITIONS

A first coating bath of this invention was prepared by mixing 625 parts of the composition of Example 1, 625 parts of the composition of Example 3 and 3750 parts of water. A second coating bath of this invention was prepared by mixing 625 parts of the composition of Example 2, 625 parts of the composition of Example 4 and 3750 parts of water. A comparison coating bath was prepared by mixing 625 parts of Comparison Composition 1, 625 parts of Comparison Composition 2 and 3750 parts of water. The ratio of silicon-bonded hydrogen atoms to silicon-bonded vinyl radicals was about 2.7 for each curable composition.

The three coating compositions were coated onto paper, cured at 220° F. for 40 seconds and evaluated for SBR adhesive release and subsequent adhesion. The results, listed in Table I, show that the compositions of this invention provide lower release and higher subsequent adhesion for SBR adhesive than the comparison composition.

The three cured coatings were evaluated for appearance and water-resistance. The compositions of this invention provided glossy cured coatings having fair to good water-resistance while the comparison composition provided a dull, matte cured coating lacking any water-resistance beyond that of uncoated paper.

TABLE I

| PVA | FRESH BATH | | AGED BATH | |
| --- | --- | --- | --- | --- |
| | RELEASE, g/in | S.A., oz/in | RELEASE, g/in | S.A., oz/in |
| * | 47 | 61 | 65 | — |
| 2 | 34 | 72 | 39 | — |
| 4 | 37 | 76 | 39 | — |

*Comparison composition not of this invention.

CURED COMPOSITION BLENDS

Three coating compositions of this invention were prepared by mixing the coating compositions of Table I which contain PVA 1 and PVA 2 in ratios of 3/1, 2/2 and 1/3 to provide coating compositions having 25%, 50% and 75% PVA 2 and 75%, 50% and 25%, respectively, PVA 1. The ratio of silicon-bonded hydrogen atoms to silicon-bonded vinyl radicals was about 2.7 for each curable composition. The resulting compositions thus contained PVA which had a calculated degree of hydrolysis of 90 mol %, 92 mol % and 94 mol %, respectively. These three coating compositions, and the two coating compositions that were used to prepare the mixtures, were coated onto paper, cured at 220° F. for 35 seconds and evaluated for SBR adhesive release. The results, listed in Table II, show that the compositions of this invention provide an adhesive release which is variable by varying the average degree of hydrolysis of the PVA that was used to prepare the coating bath.

TABLE II

| | | | | | |
| --- | --- | --- | --- | --- | --- |
| PVA 1, % | 100 | 75 | 50 | 25 | 0 |
| PVA 2, % | 0 | 25 | 50 | 75 | 100 |
| Average degree of hydrolysis | 88 | 90 | 92 | 94 | 96 |
| Release, g/in | 68 | 64 | 59 | 42 | 35 |
| Appearance | Flat | Flat | Slight Gloss | Gloss | Gloss |

EXAMPLES 5a AND 5b

The methods of Examples 1 and 3 were repeated, except using PVA 3 instead of PVA 2, to provide stable emulsions of this invention having average particle sizes of 2.3 and 2.9 micrometers, only a trace of oiling and less than 1% creaming and settling. Comparison Compositions 3 and 4 were also prepared by duplicating the preparation of Comparison Compositions 1 and 2, except on a laboratory scale, to provide stable emulsions having average particle sizes of 2.7 and 3.4 micrometers.

CURED COMPOSITIONS

A coating bath of this invention was prepared by mixing 625 parts of the composition of Example 5a, 625 parts of the composition of Example 5b and 3750 parts of water. A comparison coating bath was prepared by mixing 625 parts of Comparison Composition 3, 625 parts of Comparison Composition 4 and 3750 parts of water.

The two coating compositions were coated onto paper, cured at 300° F. for 30 seconds and evaluated for SBR adhesive release. The coating obtained from the 5a/5b coating composition was glossy and provided a 29 g/in release while the coating obtained from the comparison coating composition was flat and provided a 47 g/in release of SBR adhesive.

AQUEOUS ACRYLIC ADHESIVE RELEASE

The coating compositions based on Comparison Compositions 1+2; Examples 1+3; and Examples 5a+5b were coated onto paper and were cured for 30 seconds at 300° F. Nacor(R) 40 and Nacor 90 (aqueous acrylic adhesives available from National Starch) were applied to the cured coating with a #29 Mayer Rod, were dried for 3 minutes at 100° C. and were laminated with label stock. Adhesive release values of 137, 66 and 66 g/in, respectively, were measured for Nacor 40; and 73, 46 and 50 g/in for Nacor 90. The lower release of coatings of this invention is made apparent by these data.

EXAMPLE 6

Following the method of Example 3, an emulsion composition of this invention was prepared except using Organopolysiloxane 5 instead of Organopolysiloxane 1, and the PVA component consisted of a mixture of PVA 2 and PVA 3, taken in a 2/1 ratio instead of PVA 2. The emulsion had an average particle size of 2.9 micrometers.

EXAMPLE 7

Following the method of Example 1, an emulsion composition of this invention was prepared except using Organopolysiloxane 5 instead of Organopolysiloxane 1, and the PVA component consisted of a mixture of PVA 2 and PVA 3, taken in a 2/1 ratio instead of PVA 2. The emulsion had an average particle size of 3.4 micrometers.

CURED COMPOSITIONS

Five coating compositions of this invention were prepared by mixing the composition of Examples 1, 3, 6 and 7 in various ratios, as shown in Table III, with 3750 parts of water. The coating compositions were coated onto paper, heated at 300° F. for 30 seconds and evaluated for SBR adhesive release. The adhesive release of these compositions, all glossy, varied directly with the amount of Organopolysiloxane 4 that was present in the coating composition.

TABLE III

| EXAMPLE, parts | | | | RESIN | RELEASE, g/in | | |
| --- | --- | --- | --- | --- | --- | --- | --- |
| 1 | 3 | 6 | 7 | % | Initial | 1 mo. | 3 mo. |
| 625 | 625 | 0 | 0 | 0 | 25 | 20 | 20 |
| 625 | 312 | 312 | 0 | 12.5 | 33 | 26 | 27 |
| 625 | 0 | 625 | 0 | 25.0 | 55 | 39 | 42 |
| 312 | 0 | 625 | 312 | 37.5 | 83 | 53 | 60 |
| 0 | 0 | 625 | 625 | 50.0 | 142 | 98 | 92 |

EXAMPLE 8

The method of Example 1 was repeated except Organopolysiloxane 2 was used instead of Organopolysiloxane 1 and Organohydrogenpolysiloxane 2 was used instead of the mixture of Organohydrogenpolysiloxanes 1 and 3. The composition contained 2.2 silicon-bonded hydrogen atoms for every curing radical in the composition and had an average particle size of 2.3 micrometers.

EXAMPLE 9

The method of Example 3 was repeated except Organopolysiloxane 2 was used instead of Organopolysiloxane 1 and bis-(2-methoxyisopropyl) maleate was used instead of the cyclomethylvinylpolysiloxane. The composition contained 200 ppm Pt and had an average particle size of 1.5 micrometers.

CURED COMPOSITIONS

A coating composition of this invention was prepared by mixing the compositions of Examples 8 and 9, using 625 parts of each, and 3750 parts of water. The coating composition was coated onto paper, cured at 250° F. for 30 seconds and evaluated for adhesive release. The coating, which was glossy, released SBR adhesive with a force of 35 g/in. When Examples 8 and 9 are repeated, using PVA 1 instead of PVA 2, and when a comparison coating composition is prepared, as noted in this example, a non-glossy cured coating composition is obtained.

EXAMPLE 10

Each of the compositions of Examples 1 and 3, and of Comparison Compositions 1 and 2 were prepared in four forms, wherein the difference between the four forms was particle size.

A comparison coating bath (A-1) was prepared by mixing 625 parts of the largest particle size emulsion of Comparison Composition 1, 625 parts of the largest particle size emulsion of Comparison Composition 2 and 3750 parts of water. Three more comparison coating baths were prepared using the next largest particle size emulsions (A-2), and the next largest (A-3), and the smallest particle size emulsions (A-4) of Comparison Compositions 1 and 2.

A coating bath of this invention (B-1) was prepared by mixing 625 parts of the largest particle size emulsion of Example 1 composition, 625 parts of the largest particle size emulsion of Example 3 composition and 3750 parts of water. Three more coating baths of this invention were prepared with the second largest particle size emulsions (B-2), and the third largest (B-3), and the fourth largest particle size emulsions (B-4) of the compositions of Examples 1 and 3.

The eight coating compositions were coated onto paper, cured at 220° F. for 60 seconds and evaluated for SBR, GMS and Nacor 40 adhesive release and SBR subsequent adhesion (SAS). The results, listed in Table IV, show that, at larger particle sizes, the compositions of this invention provide lower release for all adhesives and higher subsequent adhesion for SBR adhesive than the comparison composition; but that this difference becomes less if additional work is devoted to reducing the particle sizes of the emulsions.

The benefit of this invention, i.e. obtaining a coating with higher gloss and lower adhesive release, without having to reduce the particle size of the emulsion extensively is evident from this example.

TABLE IV

| Bath | Particle Size | Appearance | Release, g/in. GMS | Release, g/in. Nacor 40 | Release, g/in. SBR | SBR SAS oz./in. |
| --- | --- | --- | --- | --- | --- | --- |
| A-1 | 3.6/3.8 | Flat | 175 | 78 | 27 | 55 |
| B-1 | 3.3/3.7 | Glossy | 73 | 40 | 15 | 77 |
| A-2 | 2.6/2.8 | V.Sl.Gl. | 107 | 65 | 25 | 70 |
| B-2 | 2.0/2.7 | Glossy | 68 | 48 | 19 | 66 |
| A-3 | 1.6/2.3 | Glossy | 90 | 53 | 22 | 68 |
| B-3 | 1.3/1.9 | Glossy | 67 | 38 | 16 | 80 |
| A-4 | 1.3/1.9 | Glossy | 85 | 48 | 22 | 69 |
| B-4 | 1.2/1.6 | Glossy | 73 | 30 | 18 | 68 |

EXAMPLES 11

When the preparation of the emulsion composition of Example 1 was repeated except a mixture of 487 parts, 839 parts and 49 parts of Organohydrogenpolysiloxanes 1, 3 and 4, respectively, were used, instead of the mixture of Organohyudrogenpolysiloxanes 1 and 3, similar results were obtained.

That which is claimed is:

1. An emulsion composition consisting essentially of:
   (A) a curable composition comprising an organopolysiloxane bearing silicon-bonded curing radicals selected from the group consisting of the hydroxyl radical and olefinic radicals;
   (B) a polyvinylalcohol emulsifying agent, having an average degree of hydrolysis of at least 90 mol %, as the sole emulsifying agent and
   (C) water.

2. An emulsion composition according to claim 1 wherein the Component (A) comprises a curable polydiorganosiloxane and an amount of an organohydrogenpolysiloxane sufficient to provide from 0.5 to 10 silicon-bonded hydrogen atoms for each of said silicon-bonded curing radicals in the composition.

3. An emulsion composition according to claim 1 wherein the Component (A) comprises a curable polydiorganosiloxane and an amount of an platinum-containing catalyst sufficient to provide from 10 to 1000 parts by weight of platinum per million parts by weight of curable polydiorganosiloxane in the composition.

4. An emulsion composition according to claim 1 wherein the Component (A) comprises a mixture of one or more curable polydiorganosiloxane fluids and one or more solid, benzene-soluble organopolysiloxane resins.

5. An emulsion composition according to claim 1 consisting essentially of from 1 to 50 parts by weight (A); from 1 to 5 percent by weight (B), based on the weight of the emulsion; and 50 parts by weight of (C).

6. An emulsion composition according to claim 1 wherein the Component (A) comprises a polydiorganosiloxane of the formula AMe$_2$SiO(Me$_2$SiO)$_x$(MeASiO)$_y$SiMe$_2$A, wherein A denotes an alkenyl radical, Me denotes the methyl radical, x has an average values of 10 or more and y has a value of from 0 to 0.1x; and an organohydrogenpolysiloxane of the formula Me$_3$SiO(Me$_2$SiO)$_m$(MeHSiO)$_n$SiMe$_3$, wherein m has a value of zero or more, n has a value of two or more, and Me denotes the methyl radical, there being from 0.9 to 3.0 silicon-bonded hydrogen atoms for every alkenyl radical in the composition.

7. An emulsion composition consisting essentially of:
   (A) a curable composition comprising an organopolysiloxane bearing silicon-bonded curing radicals selected from the group consisting of the hydroxyl radical and olefinic radicals;
   (B) a polyvinylalcohol emulsifying agent having an average degree of hydrolysis of from 94 to 99 mol %, as the sole emulsifying agent and
   (C) water.

8. An emulsion composition according to claim 7 wherein the Component (A) comprises a curable polydiorganosiloxane and an amount of an organohydrogenpolysiloxane sufficient to provide from 0.5 to 10 silicon-bonded hydrogen atoms for each of said silicon-bonded curing radicals in the composition.

9. An emulsion composition according to claim 7 wherein the Component (A) comprises a curable polydiorganosiloxane and an amount of an platinum-containing catalyst sufficient to provide from 10 to 1000 parts by weight of platinum per million parts by weight of curable polydiorganosiloxane in the composition.

10. An emulsion composition according to claim 7 wherein the Component (A) comprises a mixture of one or more curable polydiorganosiloxane fluids and one or more solid, benzene-soluble organopolysiloxane resins.

11. An emulsion composition according to claim 7 consisting essentially of from 1 to 50 parts by weight (A); from 1 to 5 percent by weight (B), based on the weight of the emulsion; and 50 parts by weight of (C).

12. An emulsion composition according to claim 7 wherein the Component (A) comprises a polydiorganosiloxane of the formula AMe$_2$SiO(Me$_2$SiO)$_x$(MeASiO)$_y$SiMe$_2$A, wherein A denotes an alkenyl radical, Me denotes the methyl radical, x has an average values of 10 or more and y has a value of from 0 to 0.1x; and an organohydrogenpolysiloxane of the formula Me$_3$SiO(Me$_2$SiO)$_m$(MeHSiO)$_n$SiMe$_3$, wherein m has a value of zero or more, n has a value of two or more, and Me denotes the methyl radical, there being from 0.9 to 3.0 silicon-bonded hydrogen atoms for every alkenyl radical in the composition.

13. An emulsion composition consisting essentially of:
   (A) a curable composition comprising an organopolysiloxane bearing silicon-bonded curing radicals selected from the group consisting of the hydroxyl radical and olefinic radicals;
   (B) a polyvinylalcohol emulsifying agent having an average degree of hydrolysis of at lease 90 mol %, as the sole emulsifying agent, and consisting of a mixture of two or more polyvinylalcohols which differ in degrees of hydrolysis; and
   (C) water.

14. An emulsion composition according to claim 13 wherein the Component (A) comprises a curable polydiorganosiloxane and an amount of an organohydrogenpolysiloxane sufficient to provide from 0.5 to 10 silicon-bonded hydrogen atoms for each of said silicon-bonded curing radicals in the composition.

15. An emulsion composition according to claim 13 wherein the Component (A) comprises a curable polydiorganosiloxane and an amount of an platinum-containing catalyst sufficient to provide from 10 to 1000 parts by weight of platinum per million parts by weight of curable polydiorganosiloxane in the composition.

16. An emulsion composition according to claim 13 wherein the Component (A) comprises a mixture of one or more curable polydiorganosiloxane fluids and one or more solid benzene-soluble organopolysiloxane resins.

17. An emulsion composition according to claim 13 consisting essentially of from 1 to 50 parts by weight (A); from 1 to 5 percent by weight (B), based on the weight of the emulsion; and 50 parts by weight of (C).

18. An emulsion composition according to claim 13 wherein the Component (A) comprises a polydiorganosiloxane of the formula $AMe_2SiO(Me_2SiO)_x(MeASiO)_ySiMe_2A$, wherein A denotes an alkenyl radical, Me denotes the methyl radical, x has an average values of 10 or more and y has a value of from 0 to 0.1x; and an organohydrogenpolysiloxane of the formula $Me_3SiO(Me_2SiO)_m(MeHSiO)_nSiMe_3$, wherein m has a value of zero or more, n has a value of two or more, and Me denotes the methyl radical, there being from 0.9 to 3.0 silicon-bonded hydrogen atoms for every alkenyl radical in the composition.

* * * * *